Feb. 26, 1963  A. R. DE BEAUSACQ  3,079,163
SAFETY SECURING MEANS FOR SKIS
Filed July 28, 1958  15 Sheets-Sheet 1
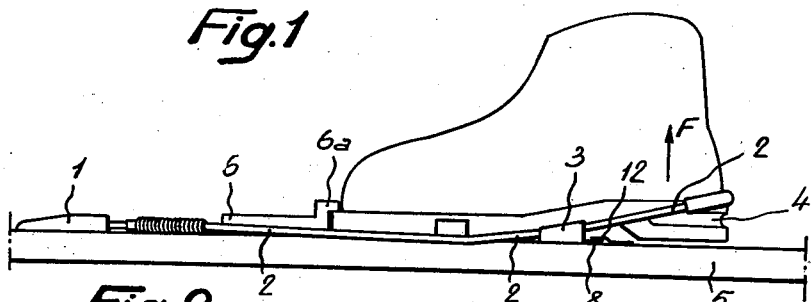
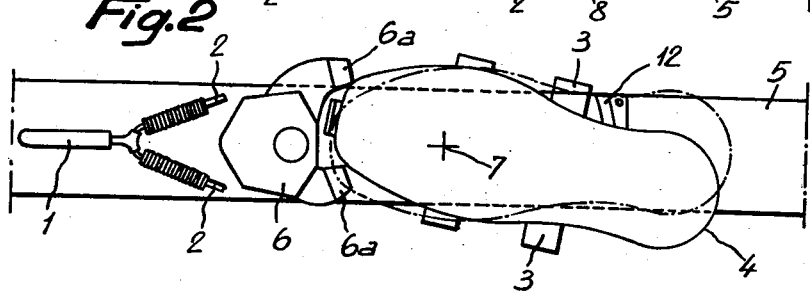
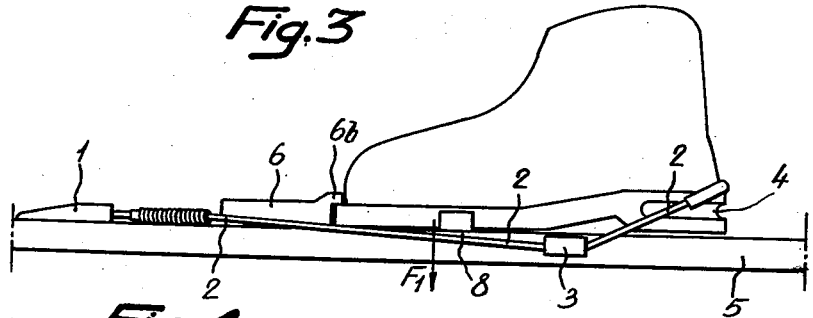
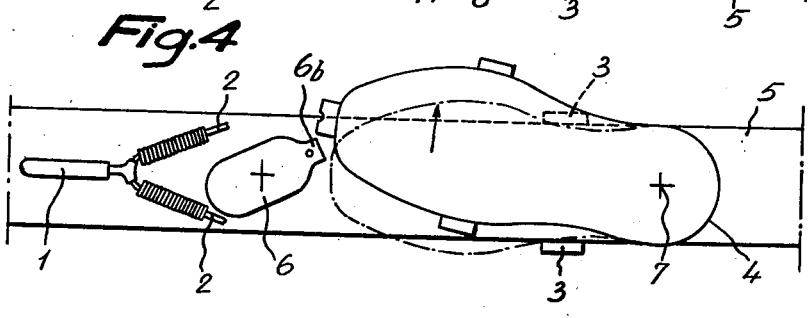
INVENTOR
ALFRED RAYMOND
DE BEAUSACQ
BY Irwin S. Thompson
ATTY.

Feb. 26, 1963   A. R. DE BEAUSACQ   3,079,163
SAFETY SECURING MEANS FOR SKIS
Filed July 28, 1958   15 Sheets-Sheet 2
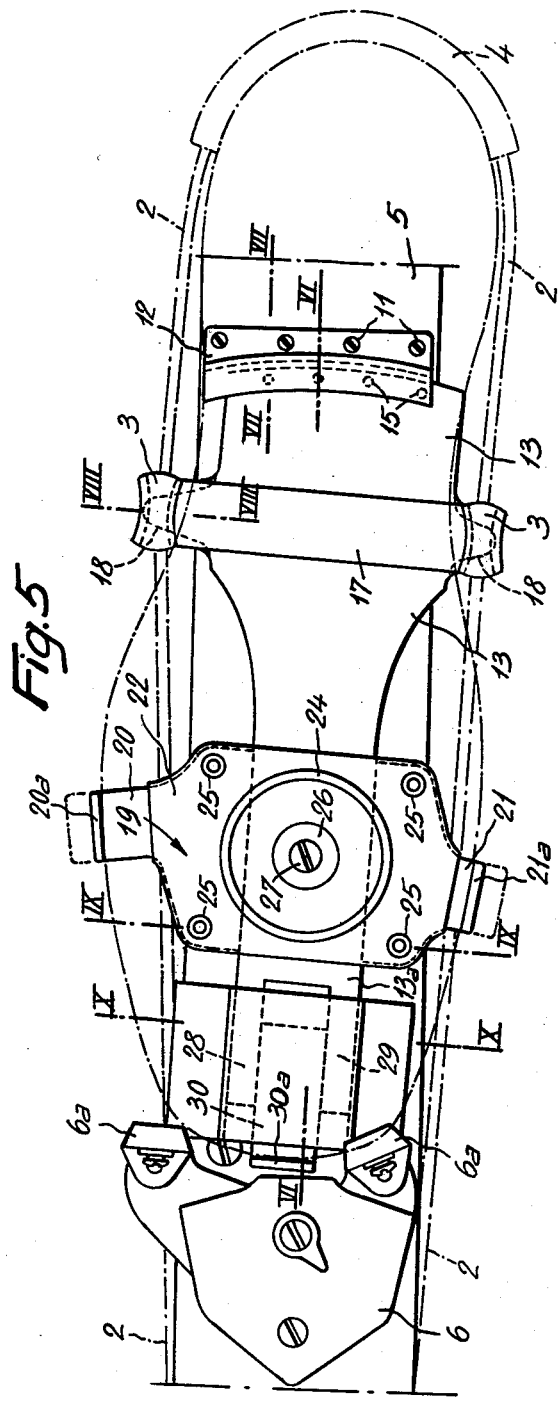
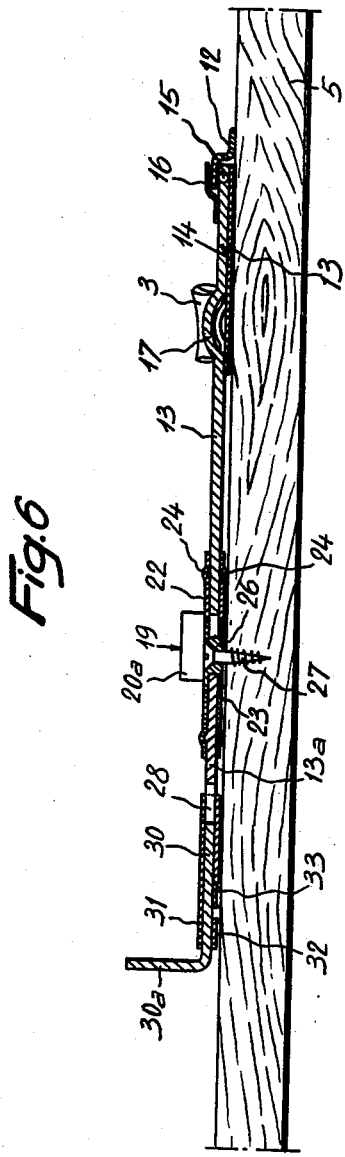
INVENTOR
ALFRED RAYMOND DE BEAUSACQ
BY Irwin S. Thompson
ATTY.

Feb. 26, 1963  A. R. DE BEAUSACQ  3,079,163
SAFETY SECURING MEANS FOR SKIS
Filed July 28, 1958  15 Sheets-Sheet 3

INVENTOR
ALFRED RAYMOND DE BEAUSACQ
By Irwin A. Thompson
ATTY.

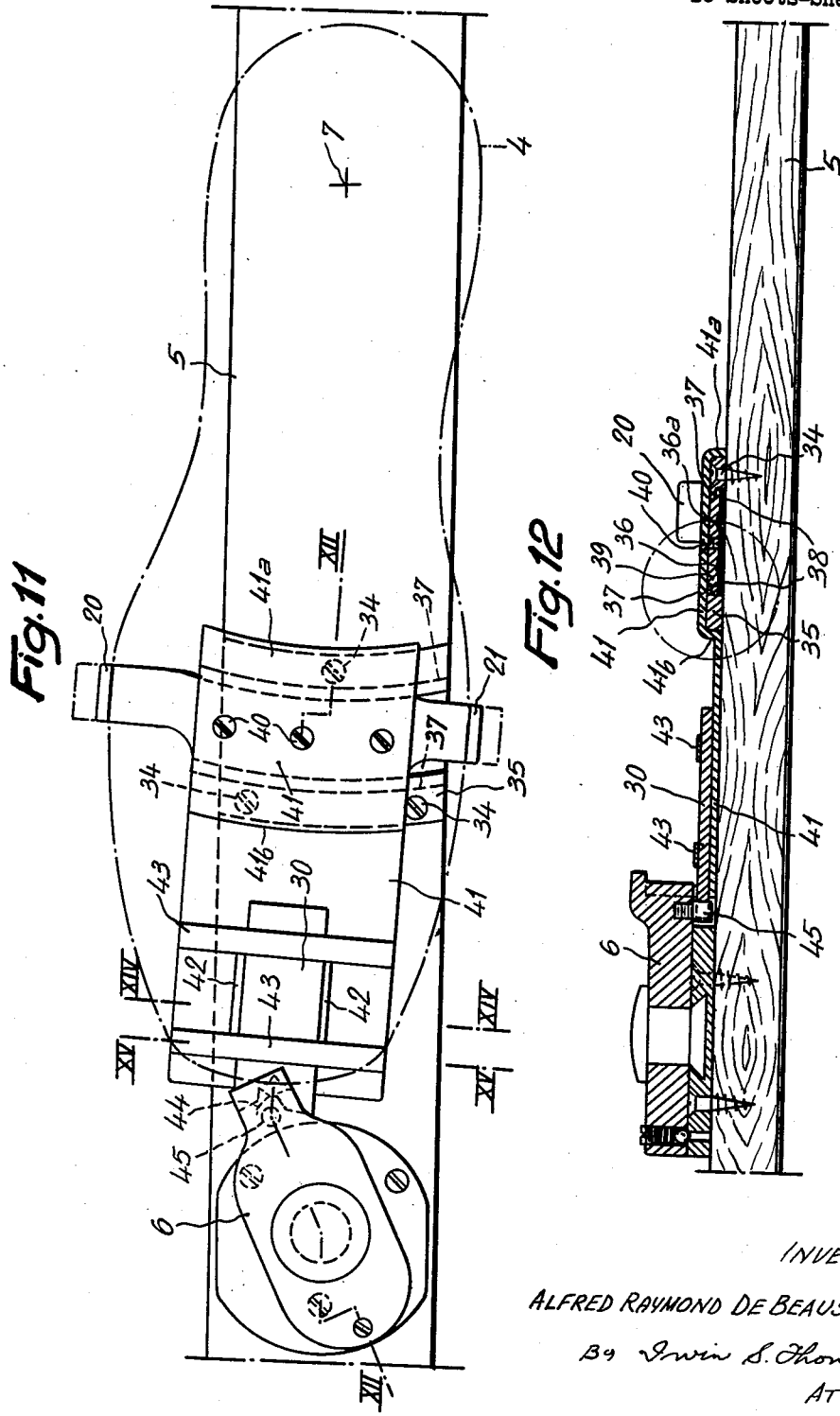

Feb. 26, 1963  A. R. DE BEAUSACQ  3,079,163
SAFETY SECURING MEANS FOR SKIS
Filed July 28, 1958 15 Sheets-Sheet 6
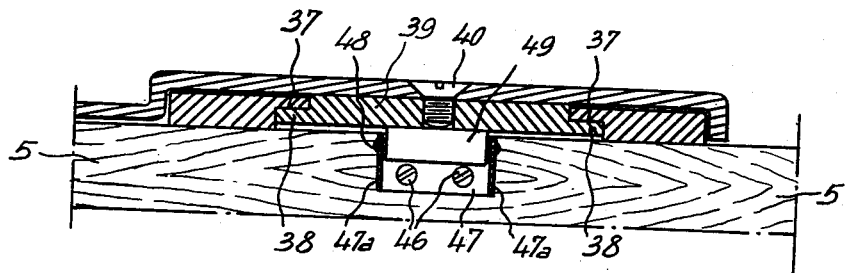
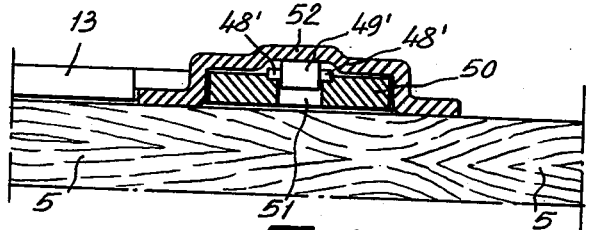
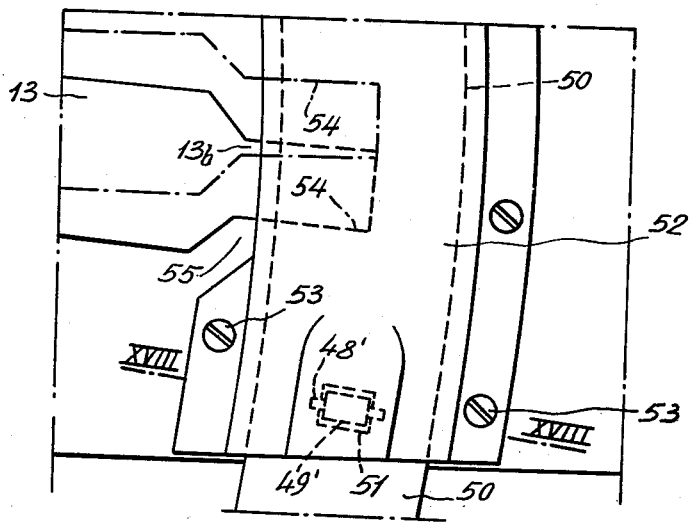
INVENTOR
ALFRED RAYMOND DE BEAUSACQ
By Irwin S. Thompson
ATTY.

Feb. 26, 1963  A. R. DE BEAUSACQ  3,079,163
SAFETY SECURING MEANS FOR SKIS
Filed July 28, 1958  15 Sheets-Sheet 7
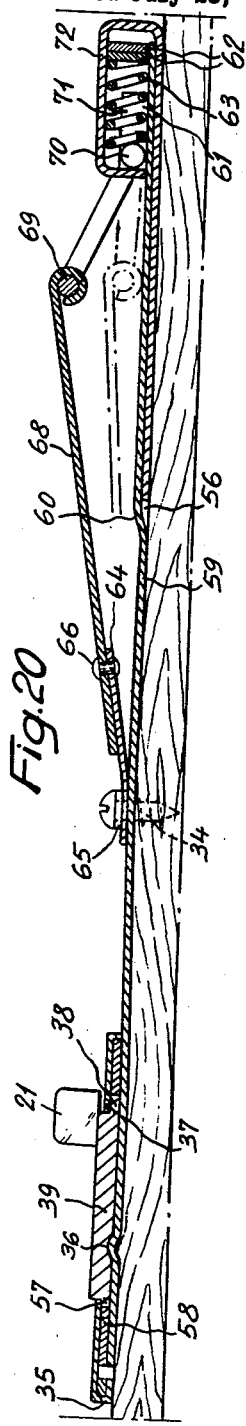
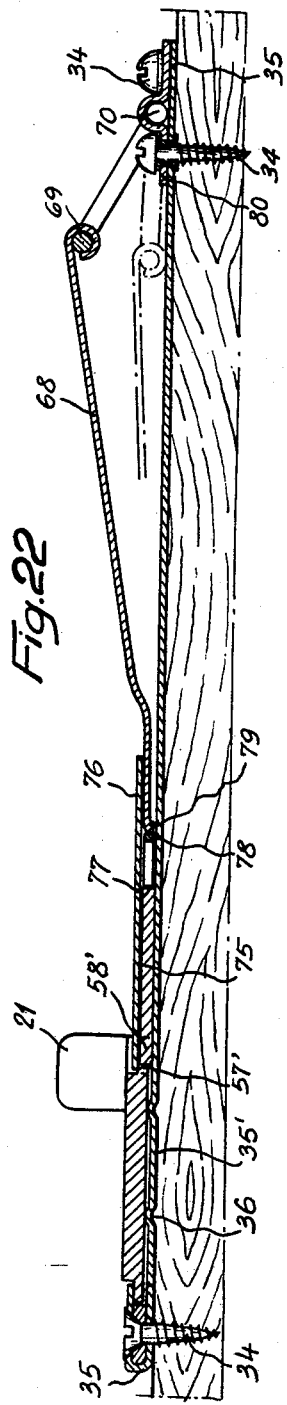
INVENTOR.
ALFRED RAYMOND DE BEAUSACQ
BY Irwin S. Thompson
ATTY.

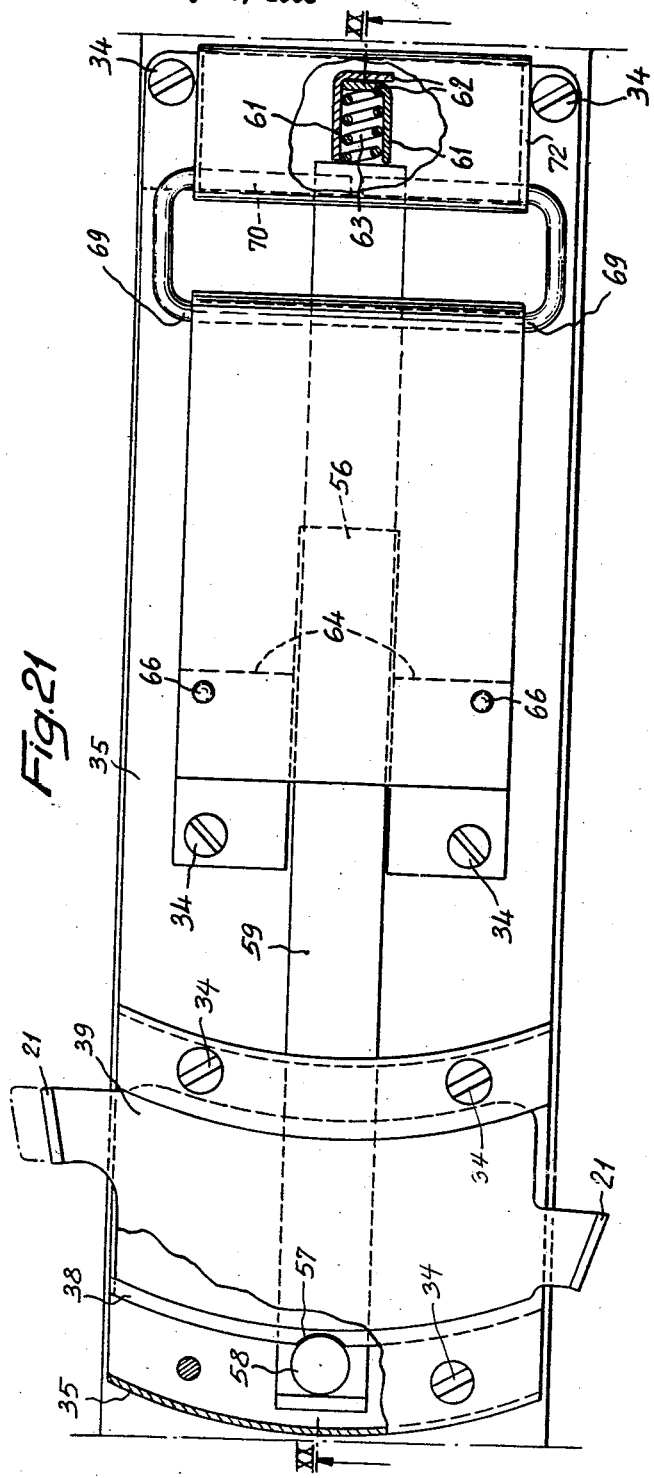

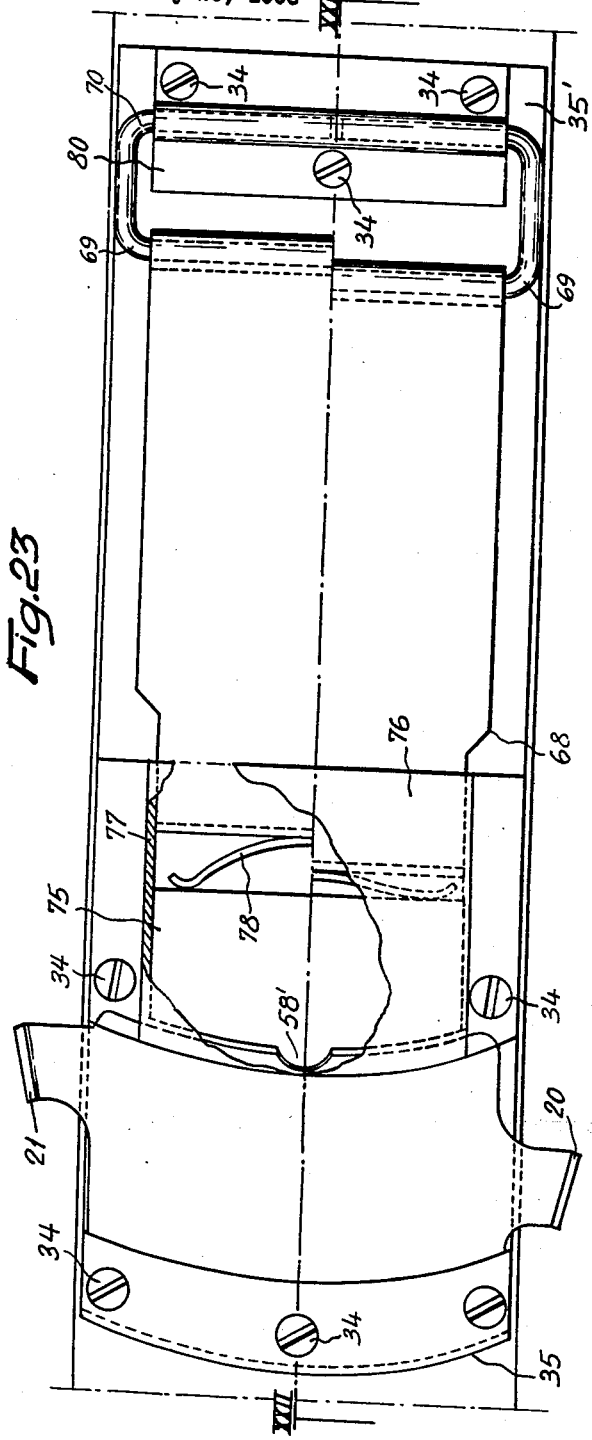

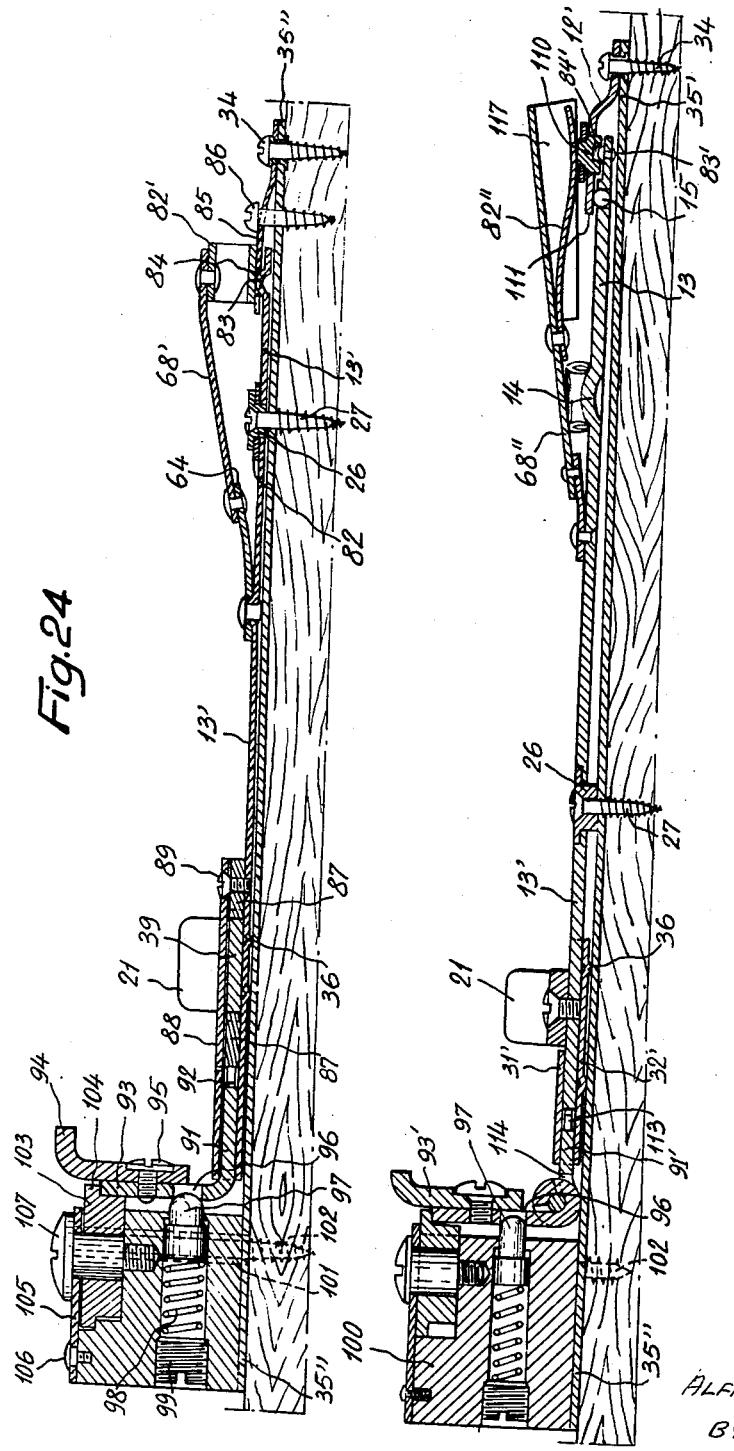

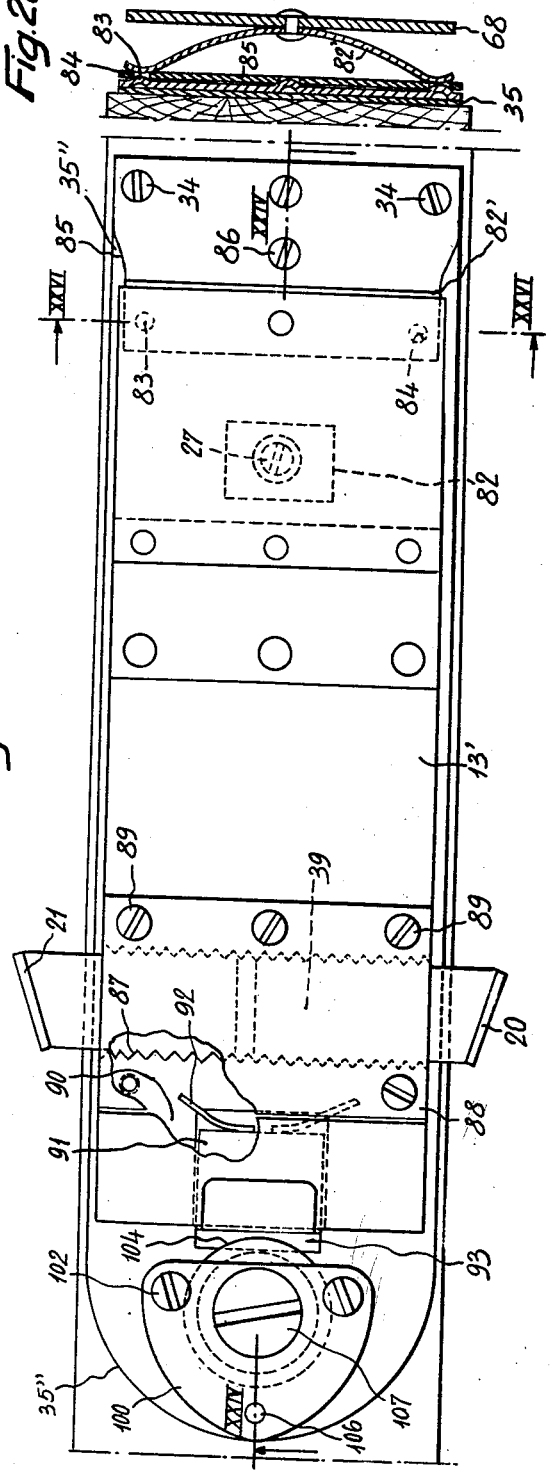

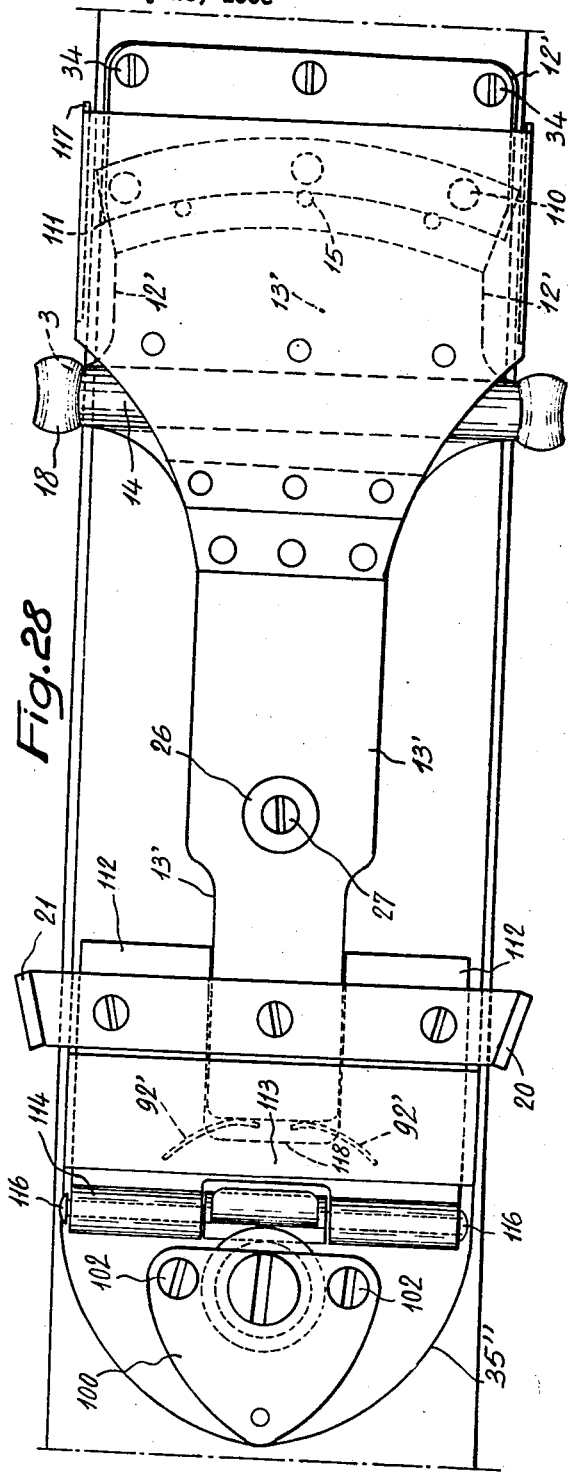

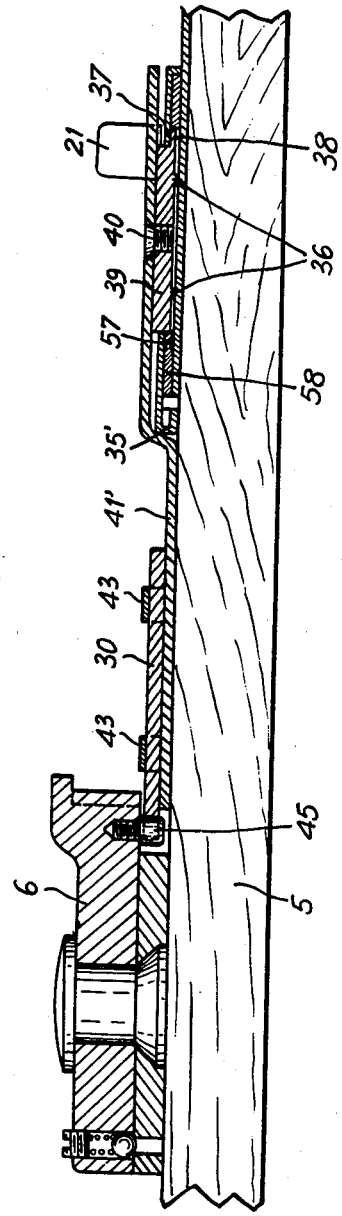

Feb. 26, 1963 A. R. DE BEAUSACQ 3,079,163
SAFETY SECURING MEANS FOR SKIS
Filed July 28, 1958 15 Sheets-Sheet 14

INVENTOR
ALFRED RAYMOND DE BEAUSACQ
BY
Irvin S. Thompson
ATTY.

Feb. 26, 1963  A. R. DE BEAUSACQ  3,079,163
SAFETY SECURING MEANS FOR SKIS
Filed July 28, 1958                                15 Sheets-Sheet 15
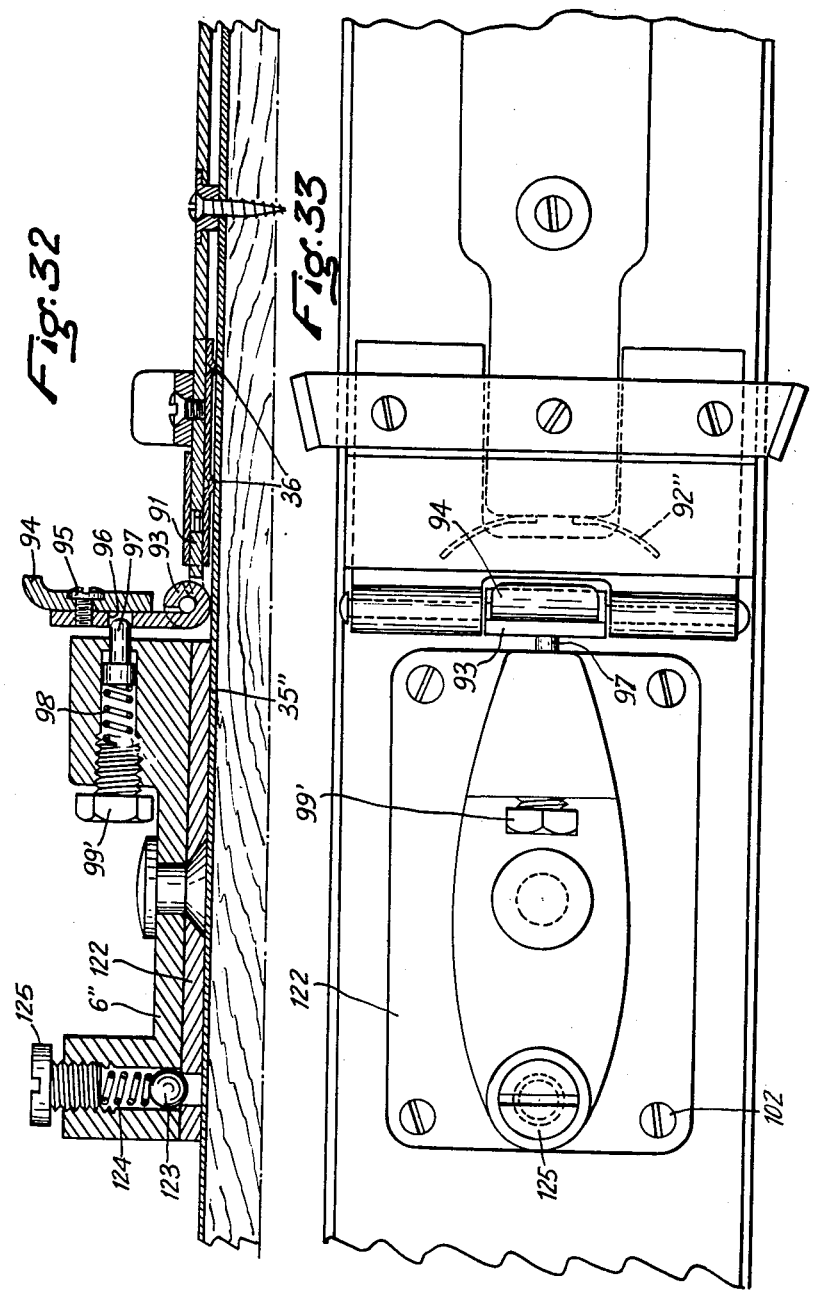
INVENTOR
ALFRED RAYMOND DE BEAUSACQ
BY
Irvin S. Thompson
ATTY.

United States Patent Office 3,079,163
Patented Feb. 26, 1963

3,079,163
SAFETY SECURING MEANS FOR SKIS
Alfred Raymond de Beausacq, 4 Rue Gustave Courbet, Paris, France
Filed July 28, 1958, Ser. No. 753,855
Claims priority, application France Aug. 2, 1957
8 Claims. (Cl. 280—11.35)

An object of this invention is to provide means for securing the skier's shoe to the ski and releasing the skier's foot when the pivotal stress exerted by the latter overbalances the resistance opposing said pivoting movement and produced by the friction inherent to such a pivotal movement and by the safety locking means.

My invention has more particularly for its object to reduce the friction between a rotary plate for the skier's shoe and a plate rigid with the ski, this being provided by projections of an extremely small height formed on one plate and engaging the other plate through surfaces of extremely reduced cross-sectional areas.

The pivotal movement of the foot is produced of necessity round a center located approximately either underneath the sole of the foot or underneath the heel.

Furthermore, the invention allows retaining during downhill skiing, the use of stirrups which are essential for upward movement with the skis, by controlling their pivotal movements with reference to the body of the ski through the safety locking means. Said control allows the stirrups to pivot round the point registering substantially with the center of the skier's heel in the second above-mentioned case of pivotal movement.

The reduction of the coefficient of friction is obtained by inserting elements such as projections, ribs or the like between the members subjected to friction. In the case of a pivotal movement round a point located underneath the sole of the skier, the elements reducing the frictional stresses are positioned between a member rigid with the ski and the pivoting support carrying the stirrups. In the second case, i.e. the case of a pivotal movement round the heel, reduction of the friction is obtained by making the sole of the shoe rest directly on a movable arcuate member pivoting round a virtual center of rotation and carrying stirrups, the elements reducing the friction being inserted between the movable member and a member of hard material rigid with the body of the ski.

My improved friction-reducing means which are essential by reason of the use of a safety pivoting stop to the front of the shoe, have for advantage not to increase the weight or height of any part of the securing means and they are also advantageously associated with yieldable locking means between the shoe-carrying pivoting plate and a point of the ski.

Reduction of the resistance of the locking means is obtained according to the present invention through the raising of the heel above a pedal which is subjected to the action of an elastic element such as a coil spring or a flat spring whereby the pedal rising with the heel reduces the resistance of the safety locking means.

This pedal may be secured either to a member rigid with the ski or to a pivoting support; in other words, the invention overcomes two drawbacks of the prior art: the objectionable friction and the impossibility of using stirrups. Further, the invention allows reducing the resistance of the locking means during the rising of the heel above the pedal.

In order to allow my invention to be properly understood, I will now describe by way of example and by no means in a binding sense, various embodiments of my invention as illustrated in the accompanying drawings, wherein the front of the ski is always shown on the left hand side. In the drawings:

FIGS. 1, 2, 3 and 4 are diagrammatic views illustrating the conventional means for securing a shoe to a ski while ensuring a release of the foot if the skier falls.

FIG. 5 is a plan view from above of a first embodiment of the invention, according to which the pivotal system revolves round the center of the stirrups underneath the sole of the foot.

FIG. 6 is a sectional view through line VI—VI of FIG. 5.

FIG. 11 is a plan view from above of a second embodiment including a pivotal system adapted to rotate round a point at the center of the heel.

FIG. 12 is a longitudinal sectional view through line XII—XII of FIG. 11.

FIGS. 16 and 17 illustrate roller bearings adapted for use in the case of FIGS. 11 and 12.

FIG. 18 is a detail sectional view of a roller bearing system adapted to be used advantageously with the embodiment illustrated in FIGS. 5 and 6.

FIG. 19 is a partial plan view corresponding to FIG. 18.

FIGS. 20 and 21 illustrate an embodiment incorporating a pedal subjected to the action of a spring adapted to reduce the pressure exerted on the locking means, FIG. 20 being a partial vertical longitudinal sectional view and FIG. 21 a view from above.

FIGS. 22 to 28 illustrate modifications of the arrangement of FIGS. 20 and 21 as applied to a ski the pivoting support of which is adapted to rock round a point registering with the front end of the skier's foot.

FIGS. 22 and 23 are a partial vertical longitudinal sectional view and a partial plan view of the first of said modifications.

FIGS. 24 and 25 are similar views of the second modification.

FIG. 26 is a transverse sectional view of said second modification through line XXVI—XXVI of FIG. 25.

FIGS. 27 and 28 are views corresponding to FIGS. 24 and 25 of the last modification.

FIG. 29 is a sectional view of a modification showing the pivotal stop of FIG. 12 used with the mechanism of FIGS. 20 and 21.

FIGS. 32 and 33 are a partial sectional view and a partial plan view illustrating the pivotal stop of FIG. 12 used with the mechanism shown in FIGS. 27 and 28.

Figure 7:
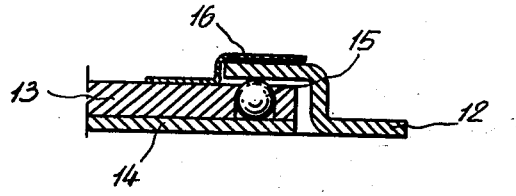
FIG. 7 is a detail view on a larger scale through line VII—VII of FIG. 5.
Figure 8:
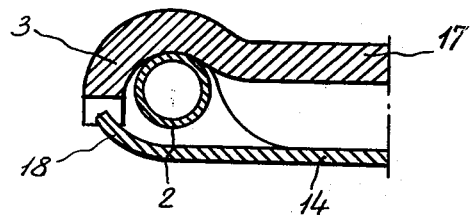
FIG. 8 is a sectional view on a larger scale through line VIII—VIII of FIG. 5.
Figure 9:
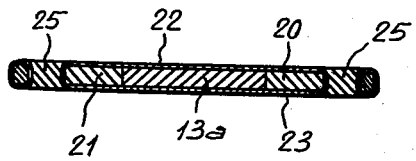
FIG. 9 is a cross-section on a larger scale through line IX—IX of FIG. 5.

In order to further explain the drawbacks of the securing and safety arrangements presently used, reference is now made to FIGS. 1, 2, 3 and 4.

In said figures, 1 designates the lever adapted to stretch the conventional cable 2 passing underneath the hooks 3 and surrounding the heel 4 of the shoe to urge it against the ski 5, while pushing the end of the shoe against one of the movable elements 6a (FIG. 2) and 6b (FIG. 4) forming abutments on the safety means 6. The movable element 6a or 6b is released under the action of the arcuate shifting of the sole as provided by a pivotal movement round the axis 7 extending through the sole of the foot (FIG. 2) or through the heel (FIG. 4).

In the case of FIGS. 1 and 2, the heel 4 should also be capable of describing an arc of a circle and consequently the hooks 3 should form a unit with the rear section of a support 8 adapted to pivot with reference to the ski round the axis 7. Since the rear end of the pivoting support 8 is subjected to a substantial, vertical, upwardly directed stress (arrow F of FIG. 1), it is urged towards the ski 5 by a guiding member 12 which produces a frictional effect during the pivotal movement of the support 8 and brakes this movement to a considerable extent.

In the case of FIGS. 3 and 4, the pivoting point of the shoe lies substantially at the center of the heel and, as already mentioned, the considerable friction opposing the transverse shifting of the point on which the skier's weight (shown by the arrow F1) bears is operative inside the area underneath the sole of the shoe.

In both cases, the friction obviously varies according to the manner in which the skier falls. The torque to be provided by the foot for overcoming the friction is often higher than the stress which should be sufficient for the normal release of the safety means. Thus, such friction often reduces the reliability of the safety means or entirely prevents it from operating properly.

In both cases, it is impossible to rely for a perfect guidance of the ski when descending a downward slope on the presence of stationary stirrups, since the unmovable character of the stirrups would prevent, in the event of the skier falling, any arcuate shifting of the tip of the foot, as required for actuation of the safety means. On the other hand, for uphill travel, it is essential to provide stirrups which are perfectly rigid with the ski.

The known arrangements have the second drawback referred to hereinabove; that is, they do not allow the use of stirrups which are rigid with the ski for downhill movement and are shiftable in the case of a fall; or else if the stirrups are associated with such known arrangements, they must include means for releasing them for downward travel, which leads to an imperfect guiding of the ski, and for locking them during upward travel, which requires the skier to execute a special operation.

The following arrangements according to the invention eliminate the drawbacks disclosed hereinabove.

A first embodiment is illustrated in FIGS. 5 and 6. To the ski 5 and substantially underneath the instep is secured by the screws 11 (FIG. 5) a member 12 having a Z-shaped cross-section. The raised end of member 12 bears over the rear arcuate section of a comparatively thick plate 13 which is adapted to pivot round the axis 27 constituted by a wood screw, plate 13 corresponding to the pivoting support 8 illustrated in FIGS. 1 and 2.

To the lower surface of the rear section of the plate 13 is welded an elastic steel blade 14 over which rest balls 15, or similar bearing members, which are held with a light fit inside their recesses (FIGS. 6 and 7). A cover plate 16 secured to the plate 13 protects the balls 15 against the objectionable introduction of snow around them.

Slightly to the front of balls 15, there is provided on the pivoting support 13 a transverse upwardly convex section 17 terminating at its ends with lugs 3 constituted by inverted troughs forming the conventional hooks such as shown at 3 in FIGS. 1 to 4. The cable 2 passing underneath hooks 3 is held in position with reference thereto by lugs 18 (FIGS. 5 and 6) formed on the steel blade 14.

The support 13 to the front of its convex section 17 includes a flat strip 13a having parallel longitudinal edges and over which is fitted a stirrup carrying member 19. Member 19 includes two lugs 20 and 21 fitted between two plates 22 and 23, the stamped edges of which match the sections of the stirrups resting on the ski. Each of plates 22 and 23 is provided with an annular groove 24 and with perforations through which pass the assembling rivets 25. These parts 20 to 23 being thus assembled, there is provided a channel with parallel surfaces between the plates 22 and 23, said channel enclosing the above-mentioned flat strip 13a on the support 13. Plates 22 and 23 are provided with an axial opening registering exactly with an opening provided in the support 13 but having a diameter larger than that of the latter. Inside these openings is housed a washer 26 secured by a screw 27 engaging the ski 5. Said screw 27 and washer 26 define the axis of the pivoting system, which includes all the movable parts mentioned hereinabove, except the part 12 bearing over the balls 15 carried by the pivoting support 13.

Figure 10:
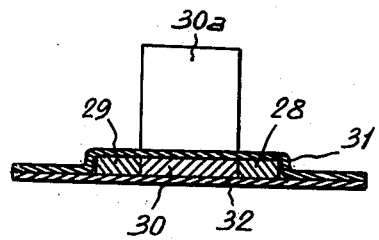
FIG. 10 is a sectional view also on a larger scale through line X—X of FIG. 5.

With a view to associating the above system with the safety means 6, the front section 13a of the pivoting support terminates with two parallel transversely spaced arms 28 and 29 forming a fork. A tongue 30 rigid with the two plates 31 and 32 (FIG. 10) is housed within this fork, a channel being provided to either side of said tongue 30 between plates 31 and 32 so as to form a passage for arms 28 and 29.

The lower plate 32 made for instance of yielding steel includes braking means 33 (FIG. 6) engaging the arms 28 and 29.

When the system thus constituted is associated with the safety means 6 including two movable stops 6a, the tongue 30 is folded, as shown at 30a so as to form an angle member with an upwardly directed flange.

When mounting the whole arrangement on the ski, the location of the stirrups is defined by providing an opening for the screw 27. The stirrup-carrying member 19 is then fitted on the front section 13a of the plate 13 until the washer 26 carried by said system engages completely the opening formed in part 13 and in the openings provided in the plates 22 and 23.

The arrangement including the parts 30, 31, 32 is then fitted between the arms 28 and 29 and the angle member 30a—30 is set between the stops 6a (FIG. 5); the compound arrangement obtained is shifted forwardly until the screw 27 registers with the opening formed therefor in the ski 5.

The whole arrangement being thus directed axially of the ski, the Z-shaped guiding member 12 is secured to the ski by means of the screws 11. The shoe is then laid over the arrangement and lines are drawn over the lugs or stirrups 20 and 21 which correspond to the breadth of the shoe and along which these lugs are bent as shown at 20a—21a. It is then sufficient to secure the shoe in the conventional manner.

The above described arrangement provides the following advantages: a reduction of the translational friction between the rear of the pivotal support 13 and the guiding member 12 as ensured by the presence of balls 15, or the like friction-reducing means, which leads to a more uniform operation and to a greater reliability for the safety means.

Complete elimination of the frictional effects of the shoe sole since the pivotal point is located underneath the point on which the body bears.

Perfect guidance of the ski for downhill travel under the action of the stirrups 20 and 21 the position of which remains stationary as long as the skier does not fall.

Possibility of obtaining a position suiting upward travel without any releasing operation being required since freedom of the pivotal movement of the system including the stirrups depends on a release of the safety locking means as obtained by the angle member 30—30a engaging the interval between the stops of the latter.

The arrangement illustrated in FIGS. 11 and 12 is more particularly intended for the case where the safety means require a substantial shifting of the tip of the shoe sole for releasing the foot when the skier falls.

Figure 13:
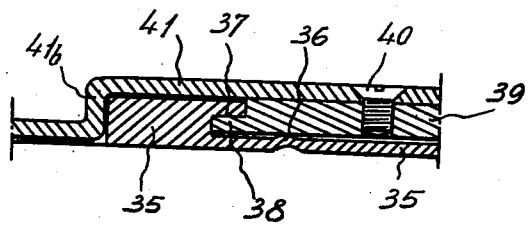
FIG. 13 is a view on a larger scale of a part of FIG. 12 located inside a circle drawn in dot-and-dash lines.

In this case, there is secured to the ski 5, for instance by means of screws 34, a plate 35 or small board preferably of hard steel, in which are formed ribs 36 and 36a for the same purpose and operation as the above-mentioned arcuate projections or balls 15. Said plate 35 is provided to the front and to the rear with two arcuate female slideways 37 engaging the shoulders of a stirrup-carrying member 39 (FIG. 13), the thickness of which is such that its upper plane extends slightly above the upper surface of the slideways 37.

The stirrup-carrying member 39 is provided with lugs 20 and 21 folded at 90° upwardly when fitted on the ski, as in the case of FIGS. 5 and 6.

To the strip 39 is secured, for instance by means of screws 40, a covering plate 41 the rear downwardly folded edge 41a of which mates with the outer arcuate edge of the rear slideway 37. The covering plate 41 similarly mates with the front edge of the front slideway 37, as illustrated at 41b but it extends forwardly and bears slightly on the ski.

Figure 14:
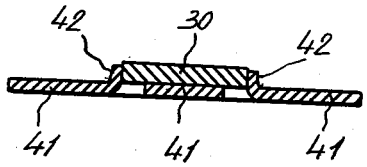
FIG. 14 and 15 are sectional views on a larger scale respectively through lines XIV—XIV and XV—XV of FIG. 11.
Figure 15:
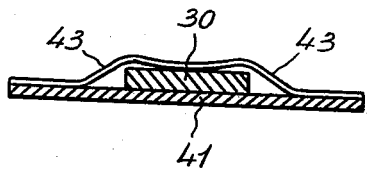

Towards the end of the front extension of the covering plate 41 are formed two small longitudinal vertically upturned flanges 42 (FIG. 14) forming guiding surfaces for a tongue 30 the longitudinal movements of which are braked by two incurved spring blades 43 (FIG. 15). The end of the tongue 30 corresponds to the shape of the movable member 6 of the safety means and engages member 6 so as to be transiently rigid with the latter. Tongue 30 is provided in the case illustrated with a notch 44 cooperating with a stud 45 carried by the movable member 6. Of course, the end of the tongue 30 may be folded upwardly at 90° if the safety means were to include two movable members such as 6 in FIGS. 5 and 6.

The positioning of the ski binding is obtained by securing the plate 35 by means of screws 34. The stirrups are then mounted, the tongue 30 being shifted forwardly into engagement with the stud 45 carried by the movable member 6. The shoe is then secured after folding the lugs 20a and 21a with the desired spacing between them, as in the preceding embodiment.

In this second example, the same advantages are obtained, to wit:

The presence of the stirrups both for upward and for downward movement.

The possibility of shifting the stirrups only when the skier falls.

No special locking or releasing of the stirrups is required when the skier ceases travelling downwardly and wishes to travel upwardly, Projections or the like means reducing friction between the parts assuming a relative movement are provided so as to overcome the friction due in the present example to the weight of the skier's body.

A direct application of weight is obtained on the stirrup system: in the first case, the bearing point being located underneath the sole of the foot, translational friction is transformed into a negligible rotary friction and in the second case, the direct application of weight on the stirrup system moving transversely over guiding projections provides for a reduction of friction to substantially zero value.

FIGS. 16, 17, 18 and 19 illustrate various modifications of the means adapted to reduce friction.

Figure 16:
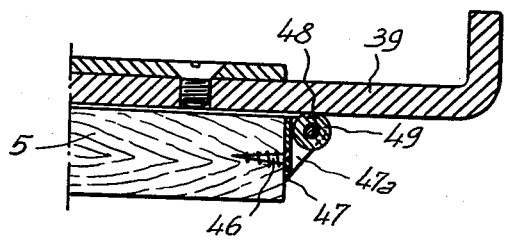

In FIGS. 16 and 17, intended more particularly for use with the arrangement according to FIGS. 11 and 12, there is provided to either side of the ski 5, a support 47 secured to the ski by screws 46 and provided with two lugs 47a. These lugs carry a spindle 48 round which revolves freely a roller 49 of a small diameter extending slightly above the surface of the ski so as to engage the stirrup-carrying member 39.

In the arrangement illustrated in FIGS. 18 and 19, rollers 49' play the same part as those illustrated in FIGS. 16 and 17. The rollers 49' are carried by a spindle 48' resting in small bearings formed in a transverse strip 50 including recesses 51 carrying the lower half of the roller 49'. The support-holding and guiding member 12 of the embodiment illustrated in FIGS. 5 and 6 is replaced by a member 52 forming a bridge which is secured to the ski by the screws 53. The strip 50 and the bridge member 52 are both arcuate as illustrated.

In the strip 50 (FIG. 19) there is formed a notch 54 adapted to be engaged by the narrow tail-piece 13b of the pivoting support 13. In the front section of the bridge 52 resting on the ski, there is provided a broad opening 55 which allows a shifting therein of the tail-piece 13b of the pivoting support.

It should also be mentioned that it is possible in the case illustrated in FIGS. 11 and 12 to provide transverse teeth on the upper surface of the stirrup, the covering plate 41 including teeth directed downwardly for cooperation with these transverse teeth on the stirrup with a view to holding the latter in place.

Turning to FIGS. 20 to 28 illustrating four embodiments incorporating a pedal on which the skier's foot rests, said pedal is adapted to reduce the pressure exerted on the locking means, as soon as the skier raises his foot, in the case of his falling, for instance. The two embodiments illustrated in FIGS. 20, 21 and in FIGS. 22, 23 relate to the incorporation of the pedal into the arrangement of FIGS. 11 and 12 and the further embodiments of FIGS. 24, 25, 26 and 27, 28 relate to the incorporation of the pedal into the arrangement of FIGS. 5 and 6.

In FIGS. 20 and 21 illustrating the first embodiment respectively in vertical sectional view and in plan view, the pedal is incorporated with the arrangement illustrated in FIGS. 11 and 12. It is intended to obtain a reduction of the pressure exerted by the safety means when the heel rises above the pedal. In FIGS. 20 and 21, there is illustrated, as precedingly, a floor plate 35 secured to the ski by the screws 34. The floor plate 35 is provided along its forward half and longitudinally with an elongated gate 56. It is further provided with arcuate female slideways 37 of a large radius arranged transversely and forming guides for the shoulders 38 of a strip 39 carrying the lateral stirrups 20 and 21 so as to form a support pivoting round a virtual center of rotation.

In the front shoulder 38 of the stirrup-carrying strip 39 there is formed an axial semi-circular recess 57. A safety locking disc 58 made of case-hardened steel is fitted within recess 57 and is secured to an elongated member 59 slidingly engaging the gate 56 in the floor. The sliding member is bent at 60, so that it may rest at its rear end over the corresponding section of the stationary floor 35.

The lateral edges 61 of the rear end of the elongated sliding member 59 are raised at 62 and are folded transversely so as to form angle sections to the rear of the sliding member. These folded sections form the rear stop for a coil spring 63 extending inside the space between said raised lateral edges 61. Said spring is adapted to act on the pedal 68 carrying the skier's heel through means disclosed hereinafter. The pedal 68 on which the skier's heel rests is constituted by a plate secured through rivets 66 to the two elastic steel plates 64 secured in their turn to the floor 35 by tubular rivets 65 held fast by further screws 34. The rear end of the pedal 68 is wound round the front side 69 of a rectangular frame constituted by a round wire folded into a rectangular shape and the rear side 70 of which forms a front bearing for the spring 63. This rear side 70 of the rectangular frame extends through the gates 71 provided in the vertical lateral walls of a cover 72 which protects the spring 63, said lateral walls including horizontal flanges through which they are secured to the floor 35. The gates 71 are slightly elongated longitudinally of the ski axis, so as to allow a sliding of the rear side 70 of the rectangular frame. The pressure of the heel on the pedal 68 lowers the latter and causes the rear side of the rectangular frame 69—70 to move toward the rear of the ski. Consequently, the angle sections 62 are urged rearwardly through a toggle link effect and through the agency of the spring 63, so as to produce through the system 68, 69, 70 a maximum pressure between the disc 58 of the safety locking means and the semi-circular recess at 57 in the stirrup-carrying member 39. It is immediately apparent that if the skier's heel rises, the rear side of the frame 70 moves forwardly and consequently the spring 63 expands, whereby the pressure exerted by it on its rear abutment is reduced and therewith the pressure exerted between the disc 58 and the semi-circular recess at 57.

In the embodiment illustrated in longitudinal cross-section and in plan view, partly broken away, in FIGS. 22 and 23, the pivoting support constituted by the pivot-carrying member 39 is mounted so as to rock round a vertical axis similar to that which has already been described with reference to FIGS. 11 and 12. However, the mounting of the pedal is different inasmuch as the spring expanding under the action of a raising of the heel above the pedal is fitted between the latter and a member sliding longitudinally over the floor. To this end, the incurved transverse spring 78 is provided with a convex central section, the convexity of which is directed rearwardly and engages the front end of the pedal 68'. The lateral ends of the spring 78 are directed forwardly and act on the rear edge of the flat member 75 sliding between the vertical walls 77 rigid with a cover 76 secured to the floor plate 35'.

The disc is replaced in this case by a semi-circular element 57' of case-hardened steel formed to the front of the flat member 75. The latter is covered, together with the spring 78 by said cover 76, the walls 77 of which are secured to the floor through tubular rivets engaged by wood screws 34 and rigidly interconnecting horizontal flanges of said walls with the floor. As already mentioned, the spring 78 which has a rectangular cross-section, is fitted between flat member 75 and the front end 79 of the pedal. On the other hand, the frame 69—70 is held merely through its rear side underneath a strap 80 secured to the floor and consequently to the ski. Thus, the raising of the heel allows the spring 78 to expand as precedingly and to urge rearwardly the pedal, the front end 79 of which slides elastically underneath the cover 76 so as to reduce the pressure exerted by the spring 78 on the member 75 and consequently the locking pressure at 57'. FIG. 23 is divided longitudinally into two sections, the upper half illustrating the positions of the parts corresponding to the unstressed condition of spring 78 (with the pedal raised), and the lower half illustrating the positions with spring 78 stressed (with the pedal lowered).

FIGS. 24, 25 and 26 illustrate a further embodiment in longitudinal sectional view as seen from above, partly broken away, and in transverse cross-section. This arrangement is similar to FIGS. 20, 21, 22, but in this case there is pivotally secured at a point slightly to the rear of the middle of the floor, a pivoting support 13' reinforced by a small plate 81 and carrying the stirrups and the pedal, the axis being constituted as in the case of FIG. 6 by a shouldered washer 26 and a screw 27.

To the support 13' is riveted a spring blade 64 to which is riveted in its turn the front end of the pedal 68'. In this case, there is provided a flat spring 82 arranged in a vertical plane (FIG. 26), said spring being riveted through its upper section to the rear end of the pedal while its lower ends bear against the spring blade 85 to be described hereinafter.

To the rear end of the pivoting support 13' are provided knobs 83 matching the shape of the recesses 84 formed in the spring blade 85. The latter is secured to the floor by tubular rivets through which pass the wood screws 34. A screw 86 adjusts the minimum pressure exerted by the spring blade 85 on the heads of the knobs 83, which pressure obviously is increased by the pressure exerted by the heel on the spring 85 through pedal 68' bearing on the blade 82.

At a point located at some distance to the front of the axis 27 of the pivoting support are provided either on the floor or on the pivoting support, ribs 36' extending along arcuate lines the center of which lies at 27.

On the other hand, two rack elements 87 are welded along a common transverse line to the support as readily shown by the torn out section of FIG. 25. Racks 87 are adapted to engage the teeth of the half stirrups 20 and 21 substituted for the unitary stirrup-carrying member 39 described precedingly. A covering plate 88 is secured over the racks by metal screws 89 so as to make the half stirrups rigid with the pivoting support after adjustment corresponding to the breadth of the shoe sole.

The front rack 87 extends forwardly in the shape of two arms 90 and to the front and between said arms is positioned the horizontal flange 91 of an angle bar 91—93 urged forwardly on the pivoting support by two flat springs 92.

On the vertical flange 93 of the angle bar, a member having an inturned section 94 for engaging the tip of the shoe is secured through a screw 95 which allows an adjustment in accordance with the thickness of the sole. The adherence between the different parts thus secured together is increased by a serration which is not illustrated.

An opening 96 provided in the lower section of the flange 93 of the angle bar 91—93 is adapted to receive the rounded head of a piston 97 urged rearwardly by a spring 98. The extent of compression of said spring is adjusted by a screw 99 screwed into a cylindrical opening formed in a block 100. The latter is rigidly secured to the floor by elongated tubular rivets 101 through which extend screws 102. The upper section of the block 100 is provided with an annular recess adapted to receive a thick washer 103 having a vertical axis and provided with a shoulder 104 at its upper end, said shoulder bearing through a section of its periphery over the upper edge of the flange 93 of the angle bar. A small plate 105 including a securing stud 106 covers the upper surface of the block 100 to which it is secured by a shouldered screw 107. This screw serves as an axis for washer 103 which is thus held in position without however this leading to a braking of the angular shifting of said washer.

The operation of this arrangement is very similar to that which has been precedingly described inasmuch as the raising of the heel above the axis of the pedal provides for an expansion of the spring 82 while the pressure of the piston 97 on the angle bar and also the pressure of the spring 85 on the knob 83 do not change. The total resistance thus opposing the pivotal movement of the pivoting support defines the minimum effort to be exerted by the foot after removing the pressure of said spring 82 with a view to overcoming the two resistances referred to, and to allowing the pivoting support to revolve. As soon as the pivot of the support has turned by a sufficient amount, the angle bar 91—93 is released with reference to the washer and progresses under the action of the springs 92, which movement disengages the tip of the shoe with reference to the inturned section 94 and produces a release of the foot.

In FIGS. 27 and 28, there is illustrated a pedal incorporated with the embodiment according to FIGS. 5 and 6. In this case, a block 100 is secured to the front of the floor plate 35" through long tubular rivets engaged by screws 34. The rotary support 13' pivots round an axis registering with the instep of the skier, the pivot of said support being formed by a washer 26 and a screw 27. The rear end of the pivoting support includes, as in the case of FIGS. 5 and 6, lateral hooks 3, a steel blade 14 with its lugs 18 and balls 15 on which rests the guiding member 12' secured to the ski.

To the rear end of the pivoting support are secured rivets of which the case hardened heads 83' enter recesses 84' formed in small cylinders 110 mounted freely in openings of the guiding member 12', said cylinders being riveted through their ends to a small blade 111.

The pedal 68" is secured to the pivoting support as in the case of FIGS. 24 to 26 and it is also subjected to the raising action of a spring 82" arranged longitudinally and engaging the cylinders 110 which are rigidly interconnected by the small blade 111.

As in the case of FIGS. 24 to 26, the front end of the pivoting support carries the angle bar 91'—93' but the vertical flange 93' of the latter is hingedly secured to the lower flange. Small plates 31' and 32' are welded to the rear arms 112 of a flat member 113 in the shape of H, the breadth of which matches that of the front of the pivoting support. This forms a channel which is similar to that described with reference to FIGS. 5 and 6. Two springs 92' carried by said arms 112 engage the front surface of the pivoting support, which urges the H-shaped member forwardly. The front arms 114 of this last-member are wound so as to carry the spindle 116 round which is pivotally secured the lower end of the vertical flange 93' of the angle bar 91'—93'. Said vertical flange carries laterally two fins or projections which are not illustrated and which prevent said arms from rocking rearwardly. As in the preceding case, said flange 93' is provided with an opening 96 engaged by the end 97 of the piston of the block 100 forming safety locking means independent of the raising of the heel.

The operation of the arrangement according to FIGS. 27 and 28 is similar to that of the arrangements which have just been described since the pedal reduces through its upward movement the pressure of the spring 82" on the cylinders 110 and consequently the pressure of the latter on the rivets 83' and finally this reduces the pressure of the safety means controlled by the spring 88'.

In order to limit the entrance of snow into the space underneath the pedal in the different arrangements described, it is possible to provide the latter with lateral flanges 117 mating the edges of the ski or extending at least into proximity with the upper surface of the latter. It is also possible to fill the free space underneath the pedal by means of an elastic block made of sponge rubber or of a vinylic plastic material for instance, which block may even form a substitute for the spring 88 provided in such a location.

In FIG. 29, the pivotal toe stop of FIG. 6 is shown associated with the pivotal plate of FIG. 20.

Figure 30:
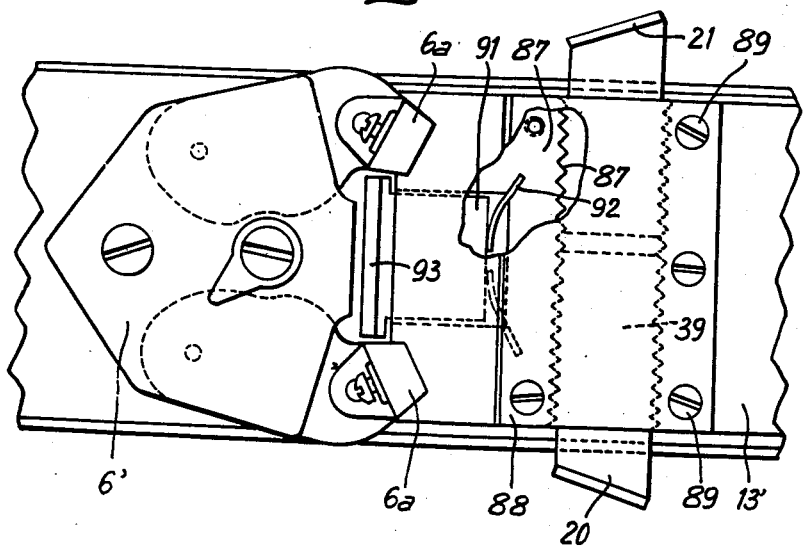
FIGS. 30 and 31 are a partial plan view and a partial longitudinal sectional view showing the pivotal stop of FIG. 5 used with the device of FIGS. 24, 25.
Figure 31:
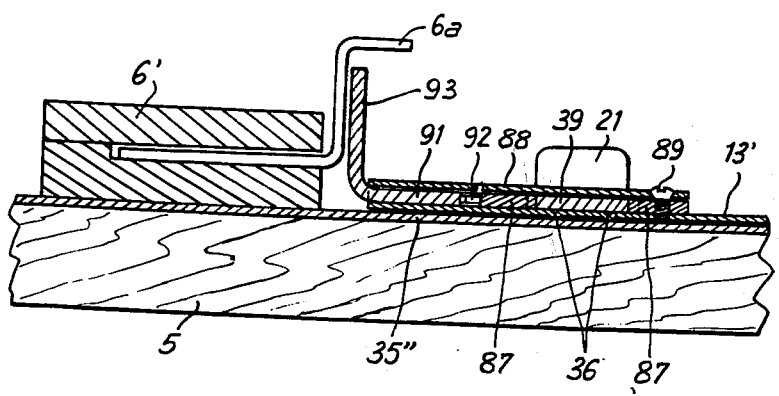

In FIGS. 30 and 31, the toe stop system of FIG. 5 is associated in the manner shown with the pivotal plate and related elements of FIGS. 24 and 25.

FIGS. 32 and 33 show the combination of the toe stop of FIG. 12 with the pivotal plate mechanism of FIGS. 27 and 28. In this case, a plate 122 having an opening near its forward edge is mounted directly between the plate 35" and the movable member 6". A releasable checking or clamping means of standard construction is located at the forward end of movable member 6". This check means comprises an upstanding cylindrical body portion having a central bore within which a spherical ball 123 is disposed. When member 6" is properly aligned on the ski, ball 123 partially engages in the aforementioned opening in plate 122 under the urging of the compressed spring 124. A screw 125 meshing in the bore provides adjustment of the compression of spring 124. From the prior descriptions of these stops and the pivotal plate systems, the operation of the modifications illustrated in FIGS. 29–33 will be clear to those skilled in the art, the individual parts being constructed in the manner already described.

Obviously, the different elements associated in the various embodiments described may be combined in any other suitable manner within the scope of the accompanying claims and the safety locking may be of any desired type.

What I claim is:

1. In a safety device for securing a shoe to a ski comprising a stop pivotally secured to the ski, a cable adapted to engage the heel end of the skier's shoe to urge the latter through its toe end against said stop, a lever adapted to stretch said cable, the combination of a first plate rigid with the ski to the rear of said stop, a rotary plate carried by the ski in superposed relationship with the first plate, adapted to revolve round a point of the ski and to form a support for the skier's shoe to be thereby subjected normally alone to the skier's weight acting through said shoe, a tongue slidably carried by the rotary support along a line passing through last-mentioned point and adapted to be secured to said rotary plate for a predetermined position thereof, an interconnecting system including cooperating male and female elements, one of said elements being rigid with the stop and the other with the front end of the tongue to cooperate at its front end with the pivotal stop to make the pivoting movement of the rotary plate dependent on the angular position of the stop, at least one projection of a very reduced height and reduced breadth formed on one of the plates and engaging the other plate within a frictional area lying inside the outline of the location of the skier's shoe, a forwardly inclined pedal, the front end of which is adapted to pivot transversely of the ski and the rear end of which is adapted to rise towards the skier's shoe heel, means disposed to the rear of said rotary plate for pivotally mounting said pedal upon said ski, a yieldable locking system including cooperating male and female elements, one of said elements being rigid with the rotary plate and the other being transversely rigid with the first plate, respectively, and a single elastic system interconnecting the pedal with the yieldable locking system and bearing simultaneously, on the one hand, against one element of said locking system to urge the elements of the latter into stationary interengagement and, on the other hand, against the pedal to urge the rear end of the latter upwardly towards the skier's shoe heel, the rising of said heel above the rear end of the pedal releasing the pressure exerted by the elastic system on the interengaged elements of the locking system.

2. In a safety device for securing a shoe to a ski comprising a stop pivotally secured to the ski, a cable adapted to engage the heel end of the skier's shoe to urge the latter through its toe end against said stop, a lever adapted to stretch said cable, the combination of a first plate rigid with the ski to the rear of said stop, a rotary plate carried by the ski in superposed relationship with the first plate, adapted to revolve around a point of the ski and to form a support for the skier's shoe to be thereby subjected normally alone to the skier's weight acting through said shoe, a tongue slidably carried by the rotary support along a line passing through last-mentioned point and adapted to be secured to said rotary plate for a predetermined position thereof, an interconnecting system including cooperating male and female elements, one of said elements being rigid with the stop and the other with the front end of the tongue to cooperate at its front end with the pivotal stop to make the pivoting movement of the rotary plate dependent on the angular position of the stop, yieldable locking system including cooperating male and female elements, one of said elements being rigid with the rotary plate and the other being transversely rigid with the first plate, respectively, means elastically urging said elements into engagement, at least one projection of a very reduced height and reduced breadth formed on one of the plates and engaging the other plate within a frictional area lying inside the outline of the location of the skier's shoe.

3. In a safety device for securing a shoe to a ski comprising a stop pivotally secured to the ski, a cable adapted to engage the heel end of the skier's shoe to urge the latter through its toe end against said stop, a lever adapted to stretch said cable, the combination of a first plate rigid with the ski to the rear of said stop, a rotary plate carried by the ski in superposed relationship with the first plate, adapted to revolve round a point of the ski and to form a support for the skier's shoe to be thereby subjected normally alone to the skier's weight acting through said shoe, a tongue slidably carried by the rotary support along a line passing through last-mentioned point and adapted to be secured to said rotary plate for a predetermined position thereof, said tongue including an upstanding member at its front end and provided with an opening therein, an interconnecting system including a male element carried slidingly by the stop and engaging normally the female element constituted by the opening in the upstanding member, at least one projection of a very reduced height and reduced breadth formed on one of the plates and engaging the other plate within a frictional area lying inside the outline of the location of the skier's shoe, a forwardly inclined pedal, the front end of which is adapted to pivot transversely of the ski and the rear end of which is adapted to rise towards the skier's shoe heel, means disposed to the rear of said rotary plate for pivotally mounting said pedal upon said ski, a yieldable locking system including cooperating male and female elements, one of said elements being rigid with the rotary plate and the other being transversely rigid with the first plate, respectively, and a single elastic system interconnecting the pedal with the yieldable locking system and bearing simultaneously, on the one hand, against one element of said locking system to urge the elements of the latter into stationary interengagement and, on the other hand, against the pedal to urge the rear end of the latter upwardly towards the skier's shoe heel, the rising of said heel above the rear end of the pedal releasing the pressure exerted by the elastic system on the interengaged elements of the locking system.

4. In a safety device for securing a shoe to a ski comprising a stop pivotally secured to the ski, a cable adapted to engage the heel end of the skier's shoe to urge the latter through its toe end against said stop, a lever adapted to stretch said cable, the combination of a first plate rigid with the ski to the rear of said stop, a rotary plate carried by the ski in superposed relationship with the first plate, adapted to revolve round a point of the ski and to form a support for the skier's shoe to be thereby subjected normally alone to the skier's weight acting through said shoe, a tongue slidably carried by the rotary support along a line passing through last-mentioned point and adapted to be secured to said rotary plate for a predetermined position thereof, said tongue including an upstanding member at its front end and provided with an opening therein, an interconnecting system including a male element carried slidingly by the stop and engaging normally the female element constituted by the opening in the upstanding member, a yieldable locking system including cooperating male and female elements, one of said elements being rigid with the rotary plate and the other being transversely rigid with the first plate, respectively, means elastically urging said elements into engagement, at least one projection of a very reduced height and reduced breadth formed on one of the plates and engaging the other plate within a frictional area lying inside the outline of the location of the skier's shoe.

5. In a safety device for securing a shoe to a ski comprising a stop pivotally secured to the ski, a cable adapted to engage the heel end of the skier's shoe to urge the latter through its toe end against said stop, a lever adapted to stretch said cable, the combination of a first plate rigid with the ski to the rear of said stop, a rotary plate carried by the ski in superposed relationship with the first plate, adapted to revolve round a point of the ski and to form a support for the skier's shoe to be thereby subjected normally alone to the skier's weight acting through said shoe, a tongue slidably carried by the rotary support along a line passing through last-mentioned point and adapted to be secured to said rotary plate for a predetermined position thereof, said tongue including a notched section at its front end, an interconnecting system including a male element rigid with the stop and normally engaging the female element constituted by said notched section of the tongue to oppose rotation of the pivoting plate, the pivoting plate being released with reference to the tongue for a predetermined stress exerted on said plate, at least one projection of a very reduced height and reduced breadth formed on one of the plates and engaging the other plate within a frictional area lying inside the outline of the location of the skier's shoe, a forwardly inclined pedal, the front end of which is adapted to pivot transversely of the ski and the rear end of which is adapted to rise towards the skier's shoe heel, means disposed to the rear of said rotary plate for pivotally mounting said pedal upon said ski, a yieldable locking system including cooperating male and female elements, one of said elements being rigid with the rotary plate and the other being transversely rigid with the first plate, respectively, and a single elastic system interconnecting the pedal with the yieldable locking system and bearing simultaneously, on the one hand, against one element of said locking system to urge the elements of the latter into stationary interengagement and, on the other hand, against the pedal to urge the rear end of the latter upwardly towards the skier's shoe heel, the rising of said heel above the rear end of the pedal releasing the pressure exerted by the elastic system on the interengaged elements of the locking system.

6. In a safety device for securing a shoe to a ski comprising a stop pivotally secured to the ski, a cable adapted to engage the heel end of the skier's shoe to urge the latter through its toe end against said stop, a lever adapted to stretch said cable, the combination of a first plate rigid with the ski to the rear of said stop, a rotary plate carried by the ski in superposed relationship with the first plate, adapted to revolve round a point of the ski and to form a support for the skier's shoe to be thereby subjected normally alone to the skier's weight acting through said shoe, a tongue slidably carried by the rotary support along a line passing through last-mentioned point and adapted to be secured to said rotary plate for a predetermined position thereof, said tongue including a notched section at its front end, an interconnecting system including a male element rigid with the stop and normally engaging the female element constituted by said notched section of the tongue to oppose the rotation of the pivoting plate, the pivoting plate being released with reference to the tongue for a predetermined stress exerted on said plate, a yieldable locking system including cooperating male and female elements, one of said elements being rigid with the rotary plate and the other being transversely rigid with the first plate, respectively, means elastically urging said elements into engagement, and at least one projection of a very reduced height and reduced breadth formed on one of the plates and engaging the other plate within a frictional area lying inside the outline of the location of the skier's shoe.

7. In a safety device for securing a shoe to a ski comprising a stop pivotally secured to the ski, a cable adapted to engage the heel end of the skier's shoe to urge the latter through its toe end against said stop, a lever adapted to stretch said cable, the combination of a first plate rigid with the ski to the rear of said stop, a rotary plate carried by the ski in superposed relationship with the first plate, adapted to revolve round a point of the ski and to form a support for the skier's shoe to be thereby subjected normally alone to the skier's weight acting through said shoe, a longitudinally slotted member rigid with the front end of the pivoting plate, a tongue sliding inside the slot thus formed, superposed plates carried respectively above and below the tongue and the slotted member to hold said tongue in position at the level of the slotted member, an interconnecting system including cooperating male and female elements, one of said elements being rigid with the stop and the other with the front end of the tongue to cooperate at its front end with the pivotal stop to make the pivoting movement of the rotary plate dependent on the angular position of the stop, a yieldable locking system including cooperating male and female elements, one of said elements being rigid with the rotary plate and the other being transversely rigid with the first plate, respectively, means elastically urging said elements into engagement, at least one projection of a very reduced height and reduced breadth formed on one of the plates and engaging the other plate within a frictional area lying inside the outline of the location of the skier's shoe.

8. In a safety device for securing a shoe to a ski, comprising a stop pivotally secured to the ski, a cable adapted to engage the heel end of the skier's shoe to urge the latter through its toe end against said stop, a lever adapted to stretch said cable, the combination of a first plate rigid with the ski to the rear of said stop, in registry with the location of the front of the skier's shoe, a rotary plate carried by the ski in superposed relationship with the first plate, adapted to revolve round a point of the ski to the rear thereof and to form a support for the skier's shoe to be thereby subjected normally to the entirety of the skier's weight acting through said shoe, a yieldable locking system including cooperating male and female elements, one of said elements being rigid with the rotary plate and the other being transversely rigid with the first plate repectively, at least one projection of a very reduced height and reduced breadth formed on one of the plates and engaging the other plate within a frictional area lying inside the outline of the location of the skier's shoe, and a pedal system comprising a forwardly inclined pedal, the rear end of which is adapted to rise towards the skier's shoe heel, a rearwardly inclined link pivotally secured to the rear upper end of the pedal, means extending transversely of the ski and to which the lower end of said pedal is secured to allow an angular movement of said pedal over the ski, and a single elastic system slidingly urging the lower end of said link longitudinally of the ski and connecting the lower end of said link with the yieldable locking system, said elastic system engaging simultaneously, on the one hand one element of said locking system to urge the elements of the latter into stationary interengagement and, on the other hand, said lower end of said link to urge the latter towards the lower end of said pedal, biasing the rear end of said pedal upwardly towards the skier's shoe heel, the rising of said shoe heel above the rear end of the pedal releasing the pressure exerted by the elastic system on the interengaged elements of the locking system.

References Cited in the file of this patent

UNITED STATES PATENTS

| | | |
|---|---|---|
| 2,534,038 | Lanz | Dec. 12, 1950 |
| 2,846,232 | Schnell | Aug. 5, 1958 |
| 2,858,138 | Dubois De La Sabloniere | Oct. 28, 1958 |

FOREIGN PATENTS

| | | |
|---|---|---|
| 846,030 | France | May 27, 1939 |
| 846,997 | France | June 19, 1939 |
| 1,047,353 | France | July 22, 1953 |
| 1,105,648 | France | July 6, 1955 |
| 1,127,940 | France | Aug. 20, 1956 |
| 754,109 | Germany | Apr. 27, 1953 |
| 596,836 | Great Britain | Jan. 12, 1948 |
| 207,087 | Switzerland | Dec. 16, 1939 |